United States Patent
Engle et al.

(10) Patent No.: US 7,206,494 B2
(45) Date of Patent: Apr. 17, 2007

(54) DETECTION RULES FOR A DIGITAL VIDEO RECORDER

(75) Inventors: Joseph C. Engle, Carmel, IN (US); Akinyemi Odutola, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1146 days.

(21) Appl. No.: 10/143,571

(22) Filed: May 9, 2002

(65) Prior Publication Data

US 2003/0210889 A1 Nov. 13, 2003

(51) Int. Cl.
- H04N 5/76 (2006.01)
- H04N 7/00 (2006.01)
- H04N 5/14 (2006.01)
- H04N 9/64 (2006.01)

(52) U.S. Cl. .................. 386/46; 348/700; 358/908
(58) Field of Classification Search .............. 386/1, 386/35, 46, 83, 95, 125; 725/22, 32, 36, 725/42
See application file for complete search history.

(56) References Cited

U.S. PATENT DOCUMENTS

| | | |
|---|---|---|
| 5,333,091 A | 7/1994 | Iggulden et al. |
| 5,818,512 A | 10/1998 | Fuller |
| 5,886,731 A | 3/1999 | Ebisawa |
| 6,100,941 A | 8/2000 | Dimitrova et al. |
| 6,272,286 B1 | 8/2001 | Asada et al. |
| 6,275,618 B1 | 8/2001 | Kodama |
| 6,449,021 B1 | 9/2002 | Ohta et al. |
| 6,469,749 B1 | 10/2002 | Dimitrova et al. |
| 6,477,649 B2 | 11/2002 | Kambayashi et al. |
| 6,487,721 B1 | 11/2002 | Safadi |
| 6,516,002 B1 | 2/2003 | Huang et al. |
| 6,643,327 B1 * | 11/2003 | Wang ............... 375/240.12 |

(Continued)

FOREIGN PATENT DOCUMENTS

CN 1200220 11/1998

(Continued)

OTHER PUBLICATIONS

W. O'Grady et al., "Real-Time Switching of MPEG-2 Bitstreams," International Broadcasting Convention, Sep. 12-16, 1997, pp. 166-170.

Primary Examiner—Thai Q. Tran
Assistant Examiner—Gelek Topgyal
(74) Attorney, Agent, or Firm—Joseph J. Laks; Ronald H. Kurdyla; Joel M. Fogelson

(57) ABSTRACT

The invention concerns a method and system for identifying commercial message segments of a video signal. A set of rules is applied for determining the occurrence of commercial messages with a higher degree of accuracy as compared to conventional methods. In general, method includes the steps of monitoring a digital bit stream comprising the video signal, detecting a change in a control field of the digital bit stream, and then selectively generating a commercial event notification responsive to the detecting step. According to one aspect of the invention, a change in at least one of a video sequence header and a sequence display extension can be detected. Alternatively, or in addition to checking for a change in control field, the method can comprise the step of detecting a change in an informational parameter of the video signal exclusive of the audio-visual content.

2 Claims, 4 Drawing Sheets

U.S. PATENT DOCUMENTS

| | | |
|---|---|---|
| 2002/0001459 A1 | 1/2002 | Fujie et al. |
| 2002/0051623 A1* | 5/2002 | Nakatani et al. ............... 386/70 |

FOREIGN PATENT DOCUMENTS

| | | |
|---|---|---|
| EP | 1193973 A2 | 4/2002 |
| GB | 2361125 A | 10/2001 |
| WO | WO 97/01930 | 1/1997 |
| WO | WO 98/32281 | 7/1998 |
| WO | WO 01/11865 | 2/2001 |
| WO | WO 01/84905 | 11/2001 |

* cited by examiner

DETECTION RULES FOR A DIGITAL VIDEO RECORDER

BACKGROUND OF THE INVENTION

1. Technical Field

The invention concerns digital video recorder, and more particularly a method and apparatus for removing commercial interruptions from video programming.

2. Description of the Related Art

Various devices have been developed to enable consumers to record video and/or audio programs for later presentation. Such devices include tape recorders, videocassette recorders, recordable compact discs, and most recently, recordable digital video discs (DVD). Hard drives and magneto optical discs have also been used.

One feature that is desirable for an MPEG media recorder is the ability to automatically identify and selectively skip segments of a recorded video signal. For example, such a feature may be useful for automatically editing out commercial messages from recorded television broadcast signals. Commercial skip is an important feature in the field of videocassette recorders. In this regard, various systems have been disclosed in the context of video cassette recorders to address this problem.

Conventional commercial skip technology in VCRs has used fading to dark frames as a cue for identifying and deleting commercial advertisements. These dark or black frames are used to generate a map of possible commercials in recorded television programming. However, this conventional approach is not entirely satisfactory because it requires one to wait while the system returns to the beginning of the segment to mark the commercial, and it uses tape sync pulse encoding of events/Startskip/StopSkip. Moreover, because conventional VCRs do not use MPEG type encoding, they cannot take advantage of more sophisticated video processing methods that can be applied for detecting video program transitions such as may occur during commercial advertisements.

In recent years, more advanced systems that record video programs to a hard disk have also implemented commercial skip features. Such systems use a specific set of rules for identifying commercials and commercial groups. In general, commercials are separated from each other and from programs by video fades to black, and audio fades to silence. Accordingly, commercials can be identified by the occurrence of certain events that are simultaneous black video and no audio. A commercial skipping device can be configured to determine when a video signal is sufficiently black and the audio is at a sufficiently low level so as to determine the occurrence of an event.

Commercial groups are groups of individual commercials that are to be skipped. The various rules for determining commercial groups are rules specifying commercial lengths, and number of commercials together. For example, if there were five events detected, with exactly one minute between them, it can fairly be assumed that these collectively represented a commercial group. The goal is to skip commercial groups. Thus, for example, the device can use "A" marks at the beginning of the commercial group (to tell the device to start skipping), and "B" marks at the end of the commercial group (to tell the device to stop skipping and resume normal video and audio output). However, these systems continue to use techniques based on principals of analog tape recording, and the skip information is a simple manipulation of the control track pulse width.

SUMMARY OF THE INVENTION

The invention concerns a method and system for identifying commercial message segments of a video signal. A set of rules is applied for determining the occurrence of commercial messages with a higher degree of accuracy as compared to conventional methods. In general, the method includes the steps of monitoring a digital bit stream comprising the video signal, detecting a change in a control field of the digital bit stream, and then selectively generating a commercial event notification responsive to the detecting step. According to one aspect of the invention, a change in at least one of a video sequence header and a sequence display extension can be detected.

Alternatively, or in addition to checking for a change in control field, the method can comprise the step of detecting a change in an informational parameter of the video signal exclusive of the audio-visual content. For example, this can include detecting a change in copyright information encoded in the digital bit stream or a change in GOP ("group of picture") composition information. The GOP composition information can be a number of frames or a picture type sequence information for each GOP. The picture type sequence information can be based on an order of I, B and P pictures in each the GOP.

The method can also include detecting the presence of a splice table in the digital bit stream. The data contained in the splice table can include timing information pertaining to the occurrence of commercial messages. This additional data can be used to help verify the presence of a commercial message.

DETAILED DESCRIPTION

Figure 1:
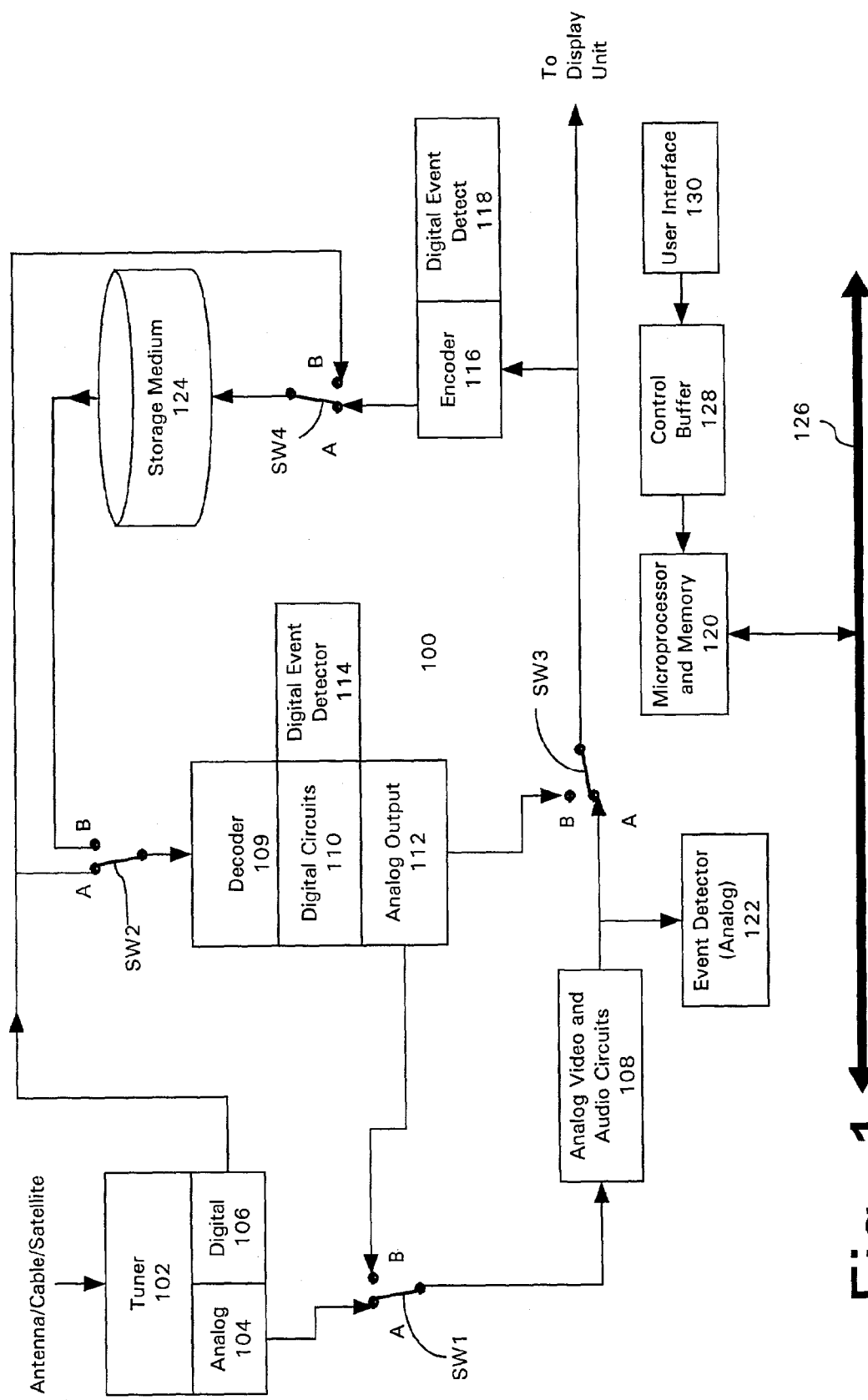
FIG. 1 is a block diagram of a digital video device that is useful for describing the inventive arrangements.

FIG. 1 is a block diagram of a digital video recording system 100 that can be used in accordance with the inventive arrangements. A system controller such as microprocessor 120 can be used for controlling the operation of the system and performing selected signal processing tasks. Microprocessor 120 can preferably include a suitable high-speed memory (not shown) as is convention for such devices. Control inputs for microprocessor 120 can be received from user interface 130 via control buffer 128. Microprocessor 120 can communicate with the various system components as shall hereinafter be described by means of system bus 126. In FIG. 1, connections to the system bus 126 from each of the various components have been omitted from the drawing for greater clarity.

The system 100 can comprise an RF tuner section 102 for receiving and down-converting an RF video signal. The RF tuner section can convert a selected channel of analog or digital RF video to a baseband signal that can be fed to an analog output section 104 or a digital output section 106.

Conventional analog video and audio circuits 108 are preferably provided for processing baseband analog video signals received from the RF tuner analog output section 104. The output of analog video and audio circuits 108 can be communicated directly to a video display monitor for directly viewing a video presentation. In addition, a digital encoder 116 is preferably provided for converting the analog video and audio output signal into a digital format. According to a preferred embodiment, the digital format can be an MPEG format or any variant thereof such as MPEG-1 or MPEG-2. However, it should be understood that the invention is not limited in this regard and any suitable digital video format can be used.

Once converted into a digital format, the video presentation can be stored on a storage medium 124. Storage medium 124 can be any one of a variety of data systems that are capable of storing digital video data for later presentation. Such devices can include, but are not limited to, recordable compact discs, recordable digital video discs in various formats including DVD-R, DVD+RW, DVD-RW, DVD-RAM. Magnetic hard drives and magneto optical discs can also be used for this purpose.

In the case where the tuner 102 receives RF video signals in a digital format, these signals can be processed in digital section 106. A baseband digital video signal can then be passed from digital section 106 to digital decoder 109. Decoder 109 is preferably configured for converting the received digital format baseband video signal and converting it to an analog output signal for display. For example, the digital decoder 109 can be an MPEG digital decoder. In that case it is preferably configured for receiving an MPEG video data signal and using that data to recreate audio and video information that was compressed using systems such as MPEG-1 and MPEG-2. The digital decoder 109 can include digital circuits 110 for parsing the digital bit stream, and providing all the data structures and digital information for the digital event detector. The digital circuits 110 also provide digital data to drive D/A (digital to analog) converters that are preferably included in the Analog Output block 112.

The digital circuits section 110 can communicate the decoded digital video output signal to analog output section 112 where a digital to analog converter (not shown) and other necessary circuitry can be provided for converting the signal to a conventional analog video format. Subsequently, the analog video signal from analog output 112 can be communicated to the display unit output for display.

One or more event detectors 114, 118, 122 can be provided for detecting the occurrence of a commercial message event. Event detectors 114 and 118 are preferably digital event detectors configured for detecting events in a digital video signal using the rules described below. By comparison, event detector 122 can detect events in an analog video signal.

Commercial message events are any combination of video signal or program characteristics that can be used to identify the occurrence of a commercial message. The combination of one or more of these "events" can be used to identify the occurrence of a commercial message. Event messages can be communicated from the event detectors 114, 118, 122 to microprocessor 120 through system bus 126.

It is difficult to ensure 100% accuracy when implementing a commercial detection and skip feature. However, one or more rules can be used to increase the accuracy of detecting events corresponding to the occurrence of commercial messages. In the present invention, the digital event detector 114, digital circuits 110 and microprocessor 120 can work together to detect events. According to a preferred embodiment, the digital event detector 114 can check the data structures in the digital circuits and look for changes in the incoming video to determine when an event has occurred.

Event Detection Rules

According to a preferred embodiment, one or more rules can be used to determine when an event has occurred, by checking for various parameters that have changed, or gone to some particular state. The invention uses intelligence (microprocessor and digital event detector logic) to implement one or more of these rules to identify commercials and commercial groups. All of these events may not occur for each commercial, but by checking for the occurrence of one or more of these events the invention increases the probability of accurately detecting commercials and/or groups of commercials.

Conventional commercial detection systems have generally relied upon changes in audio-video content to identify the occurrence of commercial messages. For example, detection of fades to black coupled with silence or low audio have been used for identifying the occurrence of commercial messages. The present invention represents a departure from these prior art techniques by implementing rules that are based on changes in one or more of a digital video control field, splice point data tables, and an information parameter of the video signal that is exclusive of the audio-visual content. Information parameters can be based on any information directly or indirectly contained in the digital video bit stream, exclusive of the audio-visual content of the video. Examples of information parameters can include coded copyright information and derived information. The derived information can include the structure and composition of groups of pictures (GOP's). Control fields are digital data fields that help control the playback of digital video, but do not generally include audio-visual content. Examples of control fields include video sequence and video sequence headers, sequence display extensions, and any other data fields that do not contain audio-visual content that is normally displayed. A more detailed explanation setting forth the manner in which this information can be used to detect commercial messages is set forth below.

Finally, the rules can make use of additional data that may be available to help verify the presence of one or more commercial messages. For example, splice point data that may be encoded in the digital video data can be used for this purpose. Similarly, conventional commercial detection methods that rely upon black frames and audio silence can also be used for more accurate results.

Copyright Extension

According to one aspect of the invention, the event detector can make use of copyright information encoded in a digital bit stream to help detect the presence of a commercial message. The program material may have copyright information, and when a commercial is transmitted it may have other copyright information or maybe none at all. Detecting a change would certainly help identify commercials.

For example, in the case of MPEG-2, the event detector can utilize information provided by digital circuits 110 to check for changes in the "Copyright Extension" information as defined in Section 6.2.3.6 of ISO/IEC 13818-2:2000 "Information Technology-Generic Coding of Moving Pictures and Associated Audio Information: Video" (hereinafter referred to as "ISO/IEC-13818-2"). This document sets forth an international standard for MPEG picture coding and is available from the International Organization for Standardization.

According to a preferred embodiment, the "video data stream" can be parsed using conventional techniques in the digital circuits 110. When the copyright extension is encountered, the copyright extension structure data is made available to the digital event detector 114. In the case of MPEG-2, the copyright information is defined in section 6.3.15 of ISO/IEC-13818-2. Section 6.3.15 defines the following parameters:

Extension_start_code_identifier—4 bits. Identifies start of copyright structure.

Copyright_identifier—8 bits. Identifies copyright authority.

Original_or_copy—1 bit. 1=original, 0=copy.

Copyright_number—total of 64 bits. Actual copyright number.

One or more of these parameters can be monitored for change. For example, the copyright number can be monitored for change. Program material will typically have a different number as compared to commercials. Changes indicate an event. The Original_or_copy bit can be monitored for change, as this would indicate an event. The Copyright_identifier can be monitored for change, as this would indicate an event. Additionally, the "Copyright Extension" may exist only for program material and not commercials, and vice-versa. Therefore, this structure may come and go, at these transitions. Therefore, monitoring the occurrence or non-occurrence of the Extension_start_code_identifier would help indicate an event. In the case of the Extension_start_code_identifier, the occurrence or non-occurrence may not be conclusive as to the presence of a commercial message since this information might not be continuously sent)

Video Sequence Information

The digital circuits 110 can also parse the "video data stream". When a "video sequence and video sequence header" are encountered this temporal occurrence can also be made available to the digital event detector 114. The structure of this information is defined in ISO/IEC-13818-2, section 6.2.2 and 6.2.2.1. Section 6.1.1 of the standard states that the video sequence commences with a "sequence header". These then indicate beginnings (and endings) of video. These are sent relatively frequently, for example, every 2 seconds. If commercials were digitally spliced into a stream, it would probably begin with a new "video sequence". Therefore, the timing of these could be used to indicate more accurately when an event occurred.

Sequence Display Extension

The digital circuits can also parse the "video data stream" for the occurrence of the "sequence display extension". When the "sequence display extension" is encountered, its structure data can also be made available to the digital event detector 114. The sequence display information is defined in ISO/IEC 13818-2, section 6.2.2.4 and section 6.3.6. The document defines several parts of this structure as:

Extension_start_code_identifier—4 bits. Identifies start of this structure.

Colour_description—1 bit. 1=colour_primaries and transfer_characteristics structure information does exist, and immediately follows.

colour_primaries—8 bits. Defines color related information intended for the display. For example this accurately defines the colors red, green, and blue, and white. There are 5 specific colour primaries defined.

Transfer_characteristics—8 bits. Defines brightness related information intended for the display. For example this accurately defines what the display should do when the signal data increases in value. That is, should the display increase in brightness proportionally, or increase exponentially. There are 7 specific transfer characteristics defined.

According to a preferred embodiment of the invention, the colour_primaries data and transfer_characteristics data can be monitored for change. Program material may have different colour_primaries data and transfer_characteristics as compared to commercials. Changes indicate an event. The Colour_description bit is monitored for change, as this would indicate an event. Additionally, the "sequence display extension" structure itself may exist only for program material and not commercials, and vice-versa. Consequently, this structure may come and go at these transitions. Accordingly, monitoring the sequence_display_extension_ID, for occurring and not occurring, would indicate an event.

Group of Pictures Information

The event detector can also look at the MPEG "group of picture" (GOP), which is composed of I-frames and optionally B-frames and P-frames. I-frames start every new group of pictures, and typically are followed by B-frames and P-frames. These frames are compressed pictures or parts of the picture to ultimately be displayed.

Section 6.2.3 of ISO/IEC 13818-2 defines these frame types as "picture_coding_type" in the "picture header" structure as follows:

Picture_coding_type—three bits.

From ISO/IEC 13818-2 table 6–12 the types are:

| Bits | Coding Method |
|------|---------------|
| 001 | intra-coded (I) |
| 010 | predictive-coded (P) |
| 011 | bidirectionally-predictive-coded (B) |

The number of the 'frames', in each GOP and order of the I, B, P frames is determined by the MPEG encoder used, and the encoding operator. For example, the amount of compression selected by the operator, or automatically implemented by the encoder may affect the length of the GOP and the order of the frames. Therefore, the number of frames in the GOP and the order of the I, B, P frames may differ from program material and commercial advertisements. The digital event detector 114 would preferably monitor these parameters and look for changes, which could indicate an event.

Splice Points

SMPTE Standard "312M-1999 Splice Points for MPEG-2 Transport Streams", defines table constructs, that are to be used for networks to signal downstream (local) stations as to when to insert or splice commercials into the program stream. As defined by the SMPTE Standard "312M-1999", these tables pertain to a specific program and are carried in program ID (PID) stream referred to by the specific program's program map table. These tables define a schedule for splice points, that is, beginning and end times, for the insertion of commercials. The tables also define when to execute the insertion, as well as "pre-roll" downstream warning flag. These are called splice_command_types and are 8 bits, defined as follows:

| splice_command_type value | Command |
|---|---|
| 0x01 | Preroll |
| 0x02 | Execute |
| 0x03 | Schedule |

The digital decoder 109, provides transport stream information and structures to the digital outputs 110. Accordingly, the event detector 114 can check for the presence of these tables. Information may or may not exist in these tables, as they may be empty, or downstream stations may have stripped the data out, or the data could be inaccurate, or the data could be accurate. If the data does not exist in these tables, then they cannot be used. If data does exist in these tables, then they would be useful in checking the invention's estimate of when commercials have occurred. If determined by the invention, is correct.

Dark Frames and Low Audio

Currently, in the United States, most programs fade to black, and the audio is faded to silence (or close to black and silence), separating commercials and programs. Individual commercials are also separated by these events.

In the digital domain, the event detector 114 can check for detection of video going to "dark" (black), and audio going low. This can be accomplished in a variety of ways. According to a preferred embodiment, the video can be decoded and stored in a frame buffer included as part of the digital circuits 110. The digital event detector 114 can scan each frame, checking to determine if all the digital values are black, representing a black frame. In actual practice there will be a predetermined, "low level" value, where any higher values, are no longer considered "black".

In the digital domain, the event detector 114 can also check for low audio. For example, the audio can be decoded and kept in an audio buffer, in the digital circuits 110. The digital event detector 114 can then scan this buffer, checking that all the digital values are 'silence', representing silenced audio. In actual practice there will actually be a predetermined, "low level" value, where any higher values, are no longer considered 'silence'. This technique has the advantage of being available for use with analog TV programs that do not include the digital data required by the other rules as described herein for identifying the occurrence of events. Using digital event detector 118 and the associated video and audio buffers described above.

Event detectors 114, 118, 122 can be programmed or pre-configured with one or more of the foregoing set of rules for determining the occurrence of an event. Commercial groups comprising two or more commercial messages can be identified using similar techniques. For example, it is conventional to make use of rules that will identify the occurrence of a commercial group when a number of events are detected by an event detector 114, 118, 122 with standard commercial lengths between each event. Examples of standard lengths include, but are not limited to, 1 minute, 30 seconds and 15 seconds. Other methods for identifying the occurrence of a commercial message or messages in a video signal are also known in the art and the invention is not intended to be limited to the exclusive use of the foregoing rules for indicating the occurrence of an event. Instead, event detectors 114, 118, 122 can be any combination of software and/or hardware that will generate a suitable output signal or notification when an event is detected.

Figure 4:
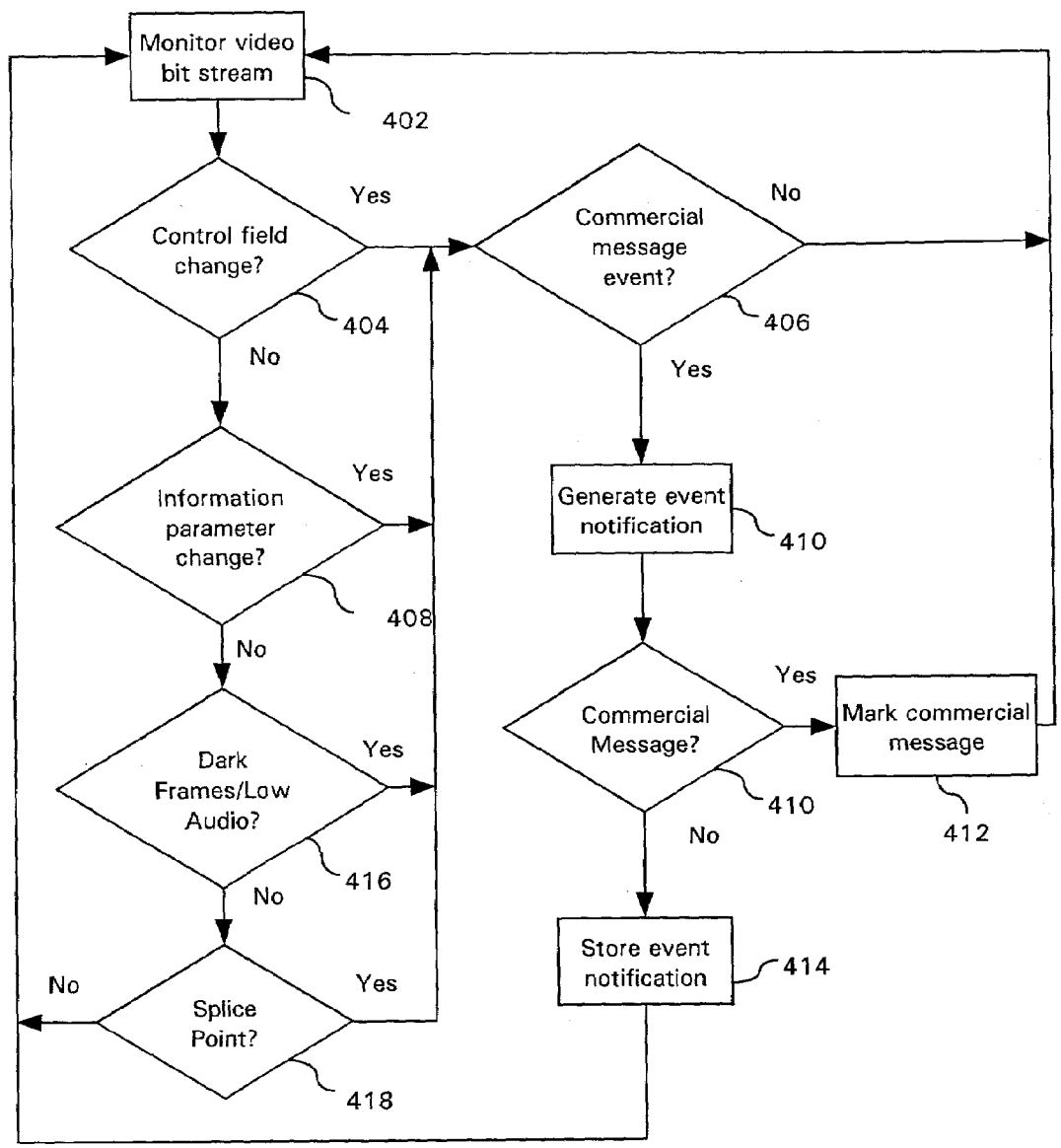
FIG. 4 is a flow chart that illustrates an exemplary process by which one or more of rules can be combined to produce more accurate commercial message detection.

FIG. 4 is a flow chart that illustrates an exemplary process by which one or more of the foregoing rules can be combined to produce more accurate commercial message detection. The process can begin in step 402 by monitoring a digital video bit stream. In steps 404, 408, and 416, the system can check respectively for a control field change, an information parameter change, and for frames that are dark and have low audio. In each case, if such a change is detected it can be evaluated in step 406 to determine if it is of a nature and quality so as to indicate the possible occurrence of a commercial message. If so, then an event notification can be generated in step 410. In step 410, an evaluation is conducted to determine whether the event notification generated in step 410 indicates the occurrence of a commercial message or group of messages. In making this determination, the system can rely upon one or more event notifications that may be stored by the system in step 414. If the system determines that the event notifications indicate the presence of a commercial message with a pre-determined level of certainty, then the system can mark the commercial message in step 412. This marking can be accomplished by modifying the digital bit stream as it is recorded and/or by storing the commercial message location/timing data in a separate file containing this information.

Splice point data in step 418 can also be used to generate event notifications. The splice point data can be included as part of the event notification generated in step 410. This data can then be used to help verify the presence of a commercial message in step 410.

It will be appreciated by those skilled in the art that the functionality provided by event detectors 114, 118 can be provided in a variety of ways. For example, these detectors can be implemented as field programmable gate arrays (FPGA's), application specific integrated circuits (ASIC's) or general purpose microprocessors programmed to perform these tasks. Further, the event detector functionality can be implemented in software as part of the processing handled by microprocessor 120. In that case, picture data can be provided directly to microprocessor 120 from digital circuits 110 and digital encoder 116 using system bus 126.

A plurality of signal switches SW1, SW2, SW3, SW4 can be controlled by microprocessor 120 responsive to user input or the switches can be under automatic control in response to certain formats of detected digital or analog video. The operation of the device in FIG. 1 shall now be described relative to several operating modes with reference to the flow charts in FIGS. 2 and 3.

Analog NTSC Operation

Recording Phase

Figure 2:
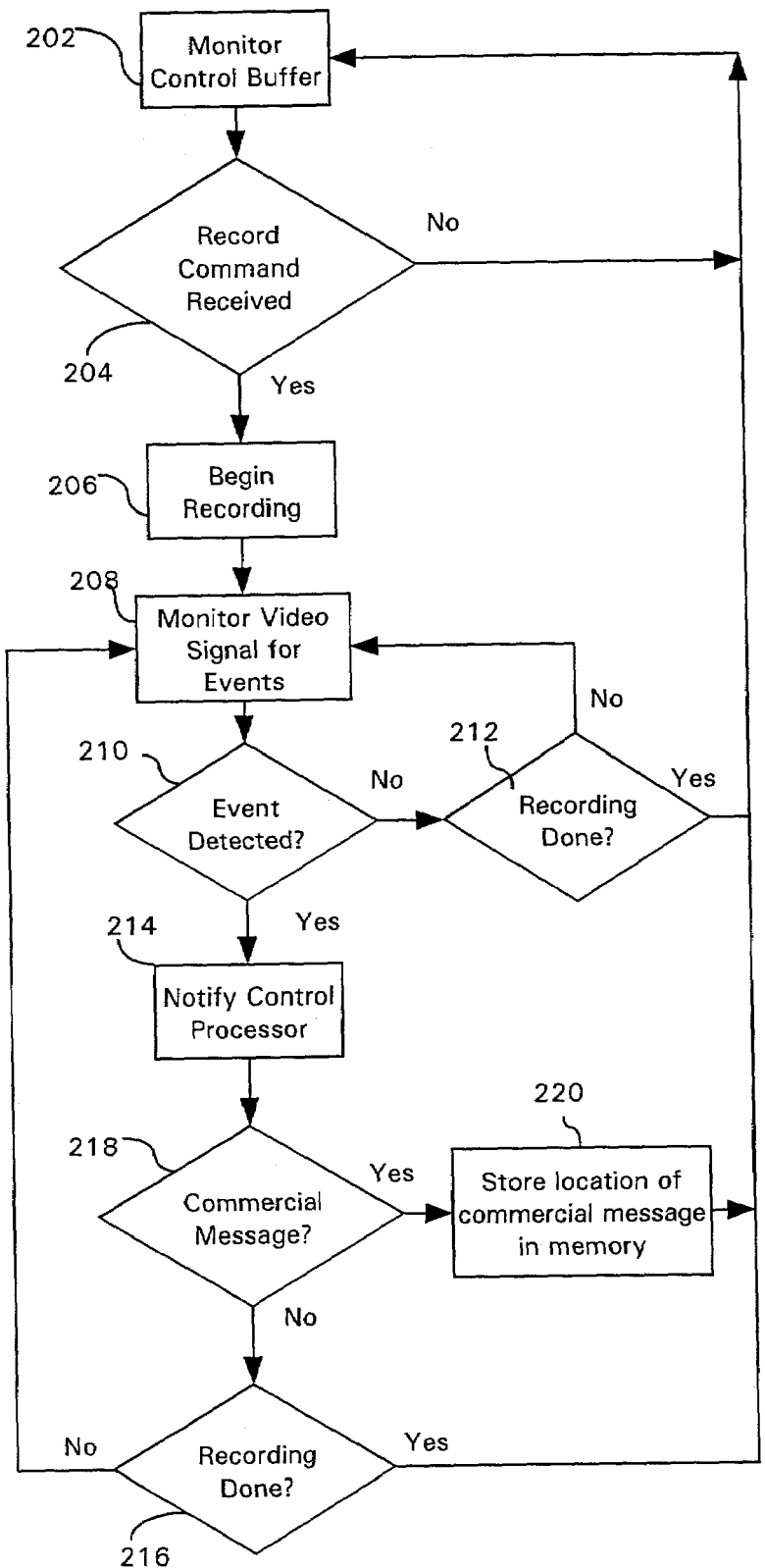
FIG. 2 is a flow chart illustrating a process that can be used for recording digital data identifying a location of a commercial message in a video presentation.

In step 202 of FIG. 2, the system can monitor control buffer 128 for user inputs. In step 204, if a record command is received, the system can begin recording as shown in step 206. According to a preferred embodiment, the microprocessor 120 can control the device 100 to set the switches in the position, SW1=A, SW2=X (any connection) SW3=A, SW4=A. Subsequently, the system can have analog signals from analog tuner output 104 go to the analog video and audio circuits 108. In step 208, digital event detector 118 can monitor the video signal from encoder 116 to detect the occurrence of commercial events. Since the coded output of the digital event detector is based on a purely analog signal, the event detector will generally be limited to identifying the occurrence of events based on fades to black and low audio associated with the occurrence of commercial messages. If such events are detected, then in step 210 the event detector 118 can communicate this information in step 214 to the control processor, in this case microprocessor 120. In step 218 the microprocessor 120 can track the events and determine when one or more commercial messages have occurred and where their beginning and end is.

When one or more commercial messages have been identified by the microprocessor 120 in step 218, this information can be recorded in step 220. This information can be recorded in memory associated with microprocessor 120, stored in a separate file on the storage medium 124, or stored as part of the MPEG digital data. In step 216, the system can check to determine if the recording process is complete. If not, the system continues the recording process.

Playback Phase

Figure 3:
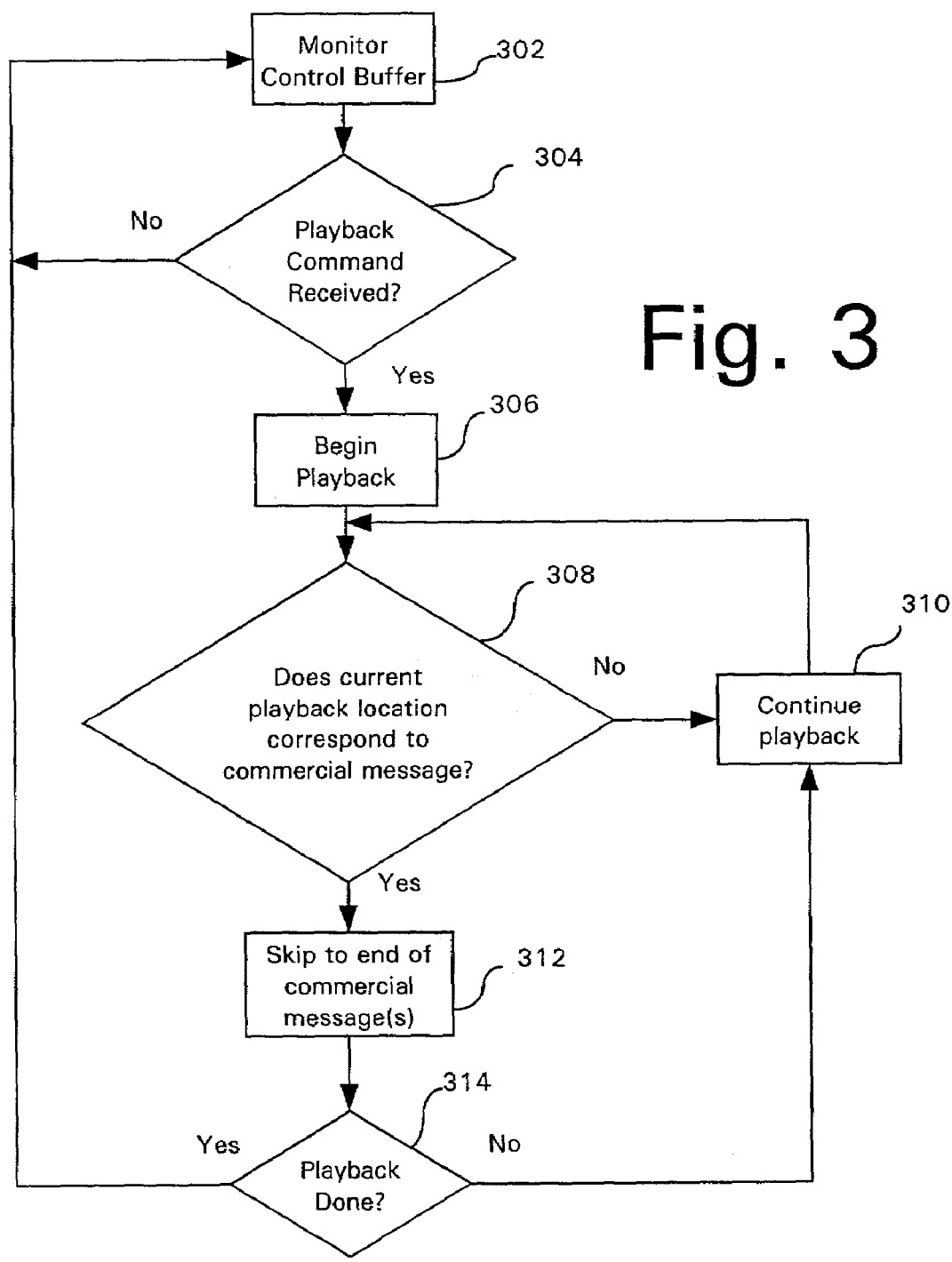
FIG. 3 is a flow chart illustrating a process that can be used for skipping a commercial message in a video presentation.

A flowchart illustrating playback operation is show in FIG. 3. In step 302, the microprocessor 120 can monitor control buffer 128 to determine if a playback command has been receive. If so, then in step 304 the system begins playback as show in step 306. When playback operation begins, the switches can be set in the positions SW1=X (any position), SW2=B, SW3=B, SW4=X (any connection). Recorded encoded video, such as MPEG video, can be played from the recording medium 124 into the digital decoder 109. Digital decoder 109 generates a decoded digital bit stream that is output from digital circuits 110. The digital bit stream can be converted to an analog format in analog output 112. The analog output signal is communicated to a display unit through analog output 112. In step 308, microprocessor 120 can use the stored information concerning the location of commercial messages to determine whether a particular portion of the playback presentation corresponds to a commercial message. If not, playback continues in step 310. However, if the portion of the playback presentation does correspond to a commercial message then the microprocessor 120 can control the playback in step 312 so as to skip over commercial messages, preferably without interruption to the program. Finally, in step 314, the system checks to see if playback is complete. If not, playback continues in step 310.

Digital Operation

Recording Phase

The recording process for digital operation is the same as described above relative to FIG. 2, with the following exceptions. With the switches in the position, SW1=X (any connection), SW2=A, SW3=B, SW4=B, the system can access digital R.F. modulated signals from tuner 102. The digitally encoded signals from block 106 supply decoder 109 and switch SW4B for recording by storage medium 124. These digital signals can be decoded in digital decoder 109 and converted to analog format in analog output 112. The digital event detector 114 can detect commercial message events using the rules as previously described. Commercial message events are communicated to microprocessor 120. Events can be stored in memory and used by microprocessor 120 to determine the location of commercial messages. When one or more commercial messages have been identified by the microprocessor 120, this information can be recorded on storage medium 124. This information can be recorded in memory associated with microprocessor 120, in a separate file on the storage medium 124, or as part of the MPEG signal.

Playback Phase

The playback operation in digital mode is essentially the same as described above relative to FIG. 3 with the following exceptions. In playback mode, the switches are in positions SW1=X (any connection), SW2=B, SW3=B, SW4=X (any connection). Encoded video, for example MPEG video, can be played from the storage medium 124 into the digital decoder 109. The digital decoder decodes the MPEG video and communicates the digital bit stream to analog output 112. The analog output signal from analog output 112 is sent to the display unit. Using the stored information concerning the location of commercial messages, microprocessor 120 can control the playback so as to skip over commercial messages, preferably without interruption to the program.

According to a preferred embodiment, event start information and event end information can be used to identify the location of a commercial message in a video presentation. This start and end information can be stored in any convenient manner. For example, each of the start and end location of the commercial message can be identified by an elapsed time since a start of recording of said video signal. Alternatively, a frame number can be used for this purpose. The frame number can correspond to a number of frames of the video signal that have been recorded since the start of recording. In either case it should be understood that the invention is not limited to any specific location identifying indicia.

Data identifying an event start and event end can be stored in a data file separate from the recorded video presentation. Microprocessor 120 can then access the data file for digital data identifying event start information and event end information, prior to the skipping step.

Instead of, or in addition to storing event start and stop data in a separate data file, such data can be recorded as part of a digital data stream comprising the recorded video presentation. For example, if the digital encoding format is MPEG the event information can be recorded following an MPEG picture header in the MPEG field identified as "extensions_and_user_data(2)". This field is provided after each picture header in an MPEG encoded signal, following the "picture_coding_extension( )" field. Bits can be defined in the extensions_and_user_data(2) field to indicate the start or stop events. This field can also be used to indicate that the particular picture is part of a commercial message. In the event that start and stop event data is encoded in this manner, decoder 109 is preferably configured to detect and respond to such indications appropriately. For example, a notification can be sent to microprocessor 120 when an event has been detected. The microprocessor can then selectively control playback to remove the display of the commercial message.

If the start event and end event data is stored as part of the video bit stream, the microprocessor can use this data to skip the portions of the video presentation associated with the commercial message. A video buffer can be provided in order to avoid any apparent interruption of the video programming. To avoid the need for a large buffer, the start event data encoded in the extensions_and_user_data(2) field can be modified after recording to also indicate the location of an end event. In this manner, when a start event is encountered the microprocessor can immediately determine the location of the end event and direct the decoder 109 to skip to that location.

According to an alternative embodiment, a digital data stream comprising the recorded video presentation can be modified by entirely deleting from the digital data stream the commercial message portion of the video signal. Using this approach will permit the benefit of commercial message removal to be gained on players without the event detectors and associated processing circuitry as described herein. The microprocessor 120 can access event start information, event end information, and a selected portion of the digital data stream. The digital data stream can then be modified to remove the commercial message portion of the video signal.

What is claimed is:

1. A method for identifying commercial message segments of a video signal, comprising the steps of:
    monitoring a digital bit stream comprising said video signal;
    detecting a change in an informational parameter of said video signal exclusive of said audio-visual content; and
    selectively generating a commercial event notification responsive to said detecting step, wherein said detection step additionally comprises:
    detecting the presence of a splice table in said digital bit stream;
    comparing a timing of said commercial event notification indicating the occurrence of a commercial message, to commercial message insertion data contained in said splice table; and,
    verifying the presence of a commercial message based on said comparing step.

2. A system for identifying commercial message segments of a video signal, comprising: a digital bit stream monitor for monitoring a digital bit stream comprising said video signal; a digital video processor for detecting a change in an informational parameter of said video signal exclusive of said audio-visual content; and means for selectively generating a commercial event notification responsive to said detected change, wherein said digital bit stream monitor further comprises
    a means for detecting the presence of a splice table in said digital bit stream and
    a processing means for comparing a timing of said commercial event notification indicating the occurrence of a commercial message, to commercial message insertion data contained in said splice table and for verifying the presence of a commercial message based on said comparing step.

* * * * *